April 23, 1968     P. D. AMUNDSEN     3,379,487
PIVOTED AUXILIARY LENS FRAME FOR SPECTACLES WITH
ADJUSTABLE WIRE BOW MEMBER SUPPORT MEANS
Filed Dec. 11, 1963

INVENTOR.
Paul D. Amundsen
BY
ATTORNEYS

United States Patent Office 3,379,487
Patented Apr. 23, 1968

3,379,487
PIVOTED AUXILIARY LENS FRAME FOR SPECTACLES WITH ADJUSTABLE WIRE BOW MEMBER SUPPORT MEANS
Paul D. Amundsen, Wonder Lake, Ill., assignor to Fendall Company, Chicago, Ill., a corporation of Illinois
Filed Dec. 11, 1963, Ser. No. 329,829
1 Claim. (Cl. 351—58)

ABSTRACT OF THE DISCLOSURE

An auxiliary lens system detachably secured to conventional spectacle frames in a manner permitting pivotal movement of the auxiliary lenses about a horizontal axis adjacent the upper edge of the spectacle frame. The auxiliary system provides for pivotal motion of the lenses adjacent the center or nose bridge and provides deformable frictional attachment of the ends of the auxiliary system adjacent the flexible temple. Frictional adjustment means provide for the accurate positioning of the auxiliary lenses during use.

---

This invention relates to movable auxiliary or modifying lenses for association with eyeglasses. More particularly, the invention contemplates the provision of an improved auxiliary lens construction ideally suited to industrial safety glass wearers but which also has many uses in the nonindustrial field.

As those skilled in the art of industrial safety equipment are aware, safety glasses are achieving continually increasing recognition throughout industry as essential to the eye safety of manufacturing personnel. More and more manufacturing personnel wear clear glass safety glasses at all times. In former times, special safety glasses were apt to be worn for special job situations such as welding, open-hearth control, and similar jobs which require observation of unusual heat or light characteristics. Such unusual characteristics are still prevalent in many industrial jobs and such special conditions have dictated the use of two pairs of safety glasses, one clear and the other special, which are cumbersome and likely to be mislaid.

In accordance with the present invention, an auxiliary lens is provided for safety glasses, or the like, in which all manner of special lenses may be mounted for immediate use by the wearer of the glasses. At the same time, should it be desirable to avoid utilization of the auxiliary lenses, the structure of the present invention permits their ready removal from the field of view without dismounting them from the frame of the eyeglasses. Further, should the occasional need for the special auxilary lenses disappear, they may easily be completely dismounted from the frame and the regular glasses returned to general use.

In accordance with the present invention, the auxiliary lenses may be adapted as a unit to any form of eyeglasses presently known without modifying such glasses and with a minimum of adjustments. This is accomplished by means of a mounting hinge which carries the auxiliary lenses. The hinge is, in turn, rigidly mounted on a bow, or chassis member, which is clipped at opposite ends to the end pieces of the frame holding the eyeglasses. This connection is preferably a friction clip attachment which may readily be adapted to most eyeglass frame dimensions by bending the clip. Similarly, the hinge connecting the bow to the auxiliary lense may be bodily moved to orient the glasses by physically bending the bow. As a result of the specific construction of the present invention, the auxiliary lenses may be pivoted upwardly away from the line of vision of the person wearing the eyeglasses or, alternatively, may be pivoted downwardly into the line of view. By employing half-lenses, the auxiliary lenses may be pivoted downwardly into viewing position in the manner permitting combined use, for example, of clear and colored lenses.

It is, accordingly, an object of the present invention to provide an improved auxiliary lens construction for association with eyeglasses.

Another object of the present invention is to provide an infinitely adjustable auxiliary lens securement to eyeglasses.

A feature of the inventions resides in the attachment of auxiliary lenses to eyeglass frames by means of a supporting bow or chassis attached by its outer ends to the end pieces of the eyeglass frame and secured at its midpoint by means of a hinge to auxiliary lenses.

Another feature of the invention is the provision of readily adjustable mounting clip means providing simple mounting of auxiliary lenses upon all manner of eyeglass frames.

Yet another object of the present invention is to provide an auxiliary, pivotally mounted, lens capable of movement into and out of the line of sight on an adjustable hinge cable of simple adjustment in the field.

Still other and further objects and features of the present invention will become at once apparent to those skilled in the art from a consideration of the following specification and drawings wherein one embodiment of the invention is shown by way of illustration only, and wherein.

As shown on the drawings.

Figure 1:
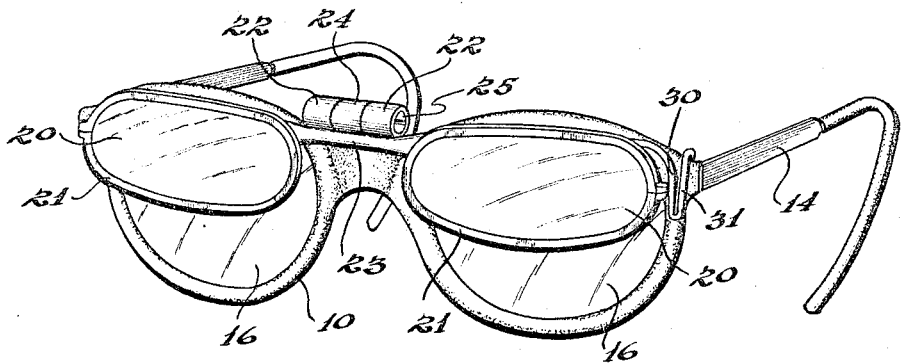
FIGURE 1 is a generally isometric view of the auxiliary lens construction of the present invention in combination with conventional eyeglasses.
Figure 2:
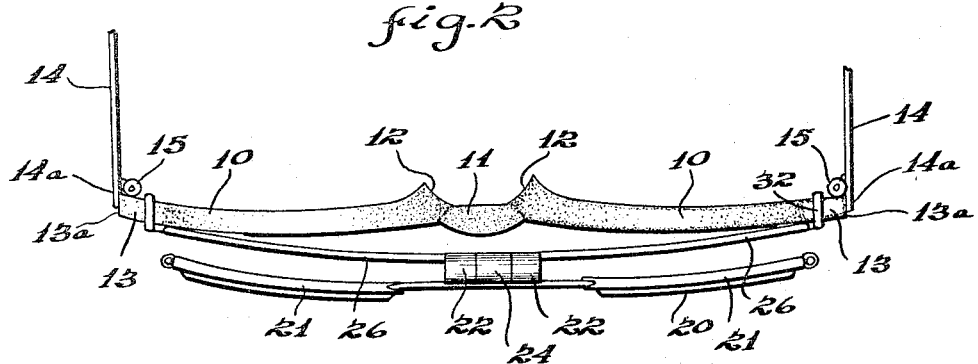
FIGURE 2 is a plan view of the combination of elements shown in FIGURE 1.

As may be clearly seen from the drawings, the eyeglasses illustrated provide an eyeglass frame 10 having an integral bridge 11 and nose pads 12 for accommodating the nose of the wearer. Temples 14 of any conventional form are secured to the end pieces 13 of the frame 10 by means of hinges 15. Adjustment of the angle between the temples 14 and the frame 10, for accommodation to the shape of the individual user's head may readily be accomplished by bending the extension 14a of the temple 14 inwardly or outwardly relative to the main portion of the temple to provide for different positions of contact with the end surfaces 13a of the eyeglass frame. The lenses 16 employed in the eyeglasses may be of any conventional type, including, for example, noncorrective clear glass lenses of the hardened safety type. Alternatively, the lenses may be of a corrective, standard spectacle type, with or without tinting.

Figure 3:
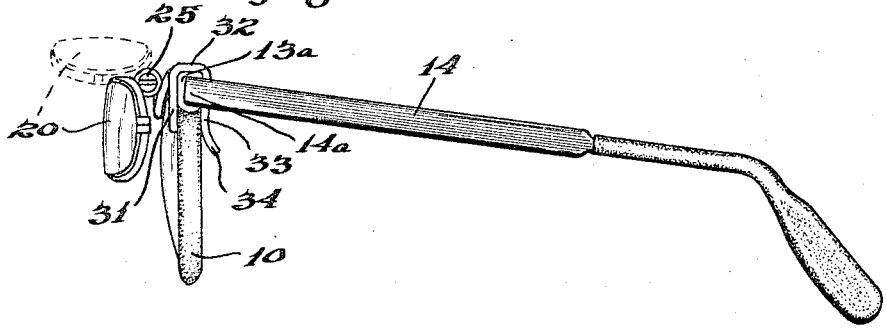
FIGURE 3 is a view in side elevation of the elements shown in FIGURES 1 and 2 illustrating two positions of the auxiliary lens.
Figure 4:
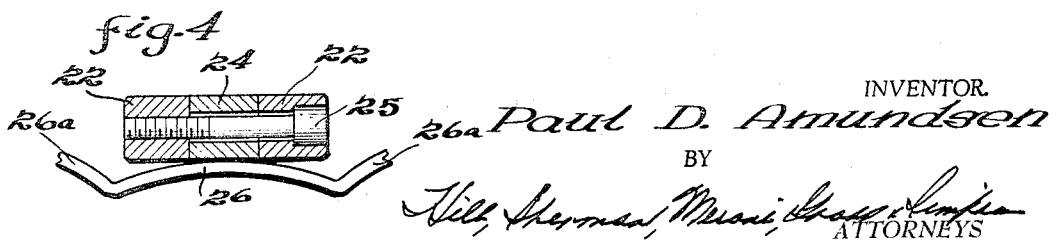
FIGURE 4 is an enlarged cross-sectional view of the hinge employed with the auxiliary lens of the present invention.

The auxiliary lenses 20 are carried by frame 21 rigidly secured, for example, by welding, to hinge ears 22 at auxiliary bridge 23. The hinge ears 22 are, in turn, pivotally secured to the central hinge portion 24 by means of an adjustable friction screw 25 and the hinge portion 24 is, in turn, rigidly secured to clip wire, or bow, 26 by welding, or similar means. The clip wire 26 is preferably bent in a configuration generally following the upper edge of the frame 10, as illustrated at 26a in FIGURE 4, and is deformed into a double U configuration at its outermost ends. This configuration is illustrated in FIGURES 1 and 3 where the first downwardly directed leg 30 is shown formed at the outermost end of the wire 26. The wire is then reversely upwardly bent in the form of leg 31, passes over the top edges of the frame in the form of a bight portion 32 and then turns downwardly in a tail portion 33 which is slightly outwardly curved at 34 to facilitate springing the clip over the eyeglass frame 10. The legs 31 and 33 are resiliently deformed toward each other to provide a distance between them substantially less than the thickness of the frame 10 as viewed in FIGURE 3, so that a substantial deformation of the clip end is required for assembly of the clip onto the frame. This deformation provide a snug spring fit which permits accommodation of the clip to frames of varying thicknesses including metal eyeglass frames which are conventionally substantially thinner than the plastic-type illustrated.

As a result of the fact that the clip wire 26 extends a substantial distance from the hinge 24 to the point of securement at 13, the hinge 24 may readily be moved upwardly or downwardly relative to the line of vision of the eyeglass wearer by deforming the wire permanently. This may be accomplished merely by bending the relatively thin clip wire 26 beyond its elastic limit. The wire chosen for the clip is intentionally readily bendable beyond its elastic limits by conventional optometrist's pliers so that adjustments of the hinge position to the individual wearer may readily be made in the field. This adjustment permits the auxiliary lenses 20 to be moved upwardly or downwardly relative to the line of vision of the individual wearer and assures comfortable vision for him.

As shown in the drawings, the auxiliary lens may be pivoted about the hinge 24, 25 into the dotted line position indicated in FIGURE 3. In such position, the auxiliary lens is a light shade, when the lens is of a filtering type. The lens may be further pivoted in the upward direction until it is completely out of useful function. In the position illustrated in FIGURE 3, the partial or half-lens 20 covers the upper edge of the path of vision through the eyeglasses and by tilting his head, the wearer may readily view the subject of his attention, either through the combined lenses 16 and 20, or, alternatively, through the lower portion of the lenses 16 alone. Thus, open-hearth operators or others required to look at extremely bright light or sources of radiation dangerous to the worker unless filtered, may observe such sources of light readily through the auxiliary lenses 20 but may shift their vision only slightly to view the object, when it is not emanating radiation, through the uncolored lens 16.

A second, important, utilization of the lenses of the auxiliary type here illustrated lies in the provision of plus power corrective lenses in the auxiliary lens frame 21. Such corrective lenses may, of course, be clear glass and of a magnification providing, in effect, bifocal eyeglasses. By providing the bifocal portion of the upper edge of the line of vision, persons required to read signs, overhead signals, and the like, at positions above the head find it possible to do so without the very difficult bending of the head that would be required from conventional bifocal glasses in which the higher magnification section is at the bottom. Further, in such bifocal uses, complete movement of the magnification section out of view, or removal completely from the glasses permits use of the glasses for distance viewing without inconvenience.

It will be seen that I have provided substantially improved eyeglasses that very simply provide special protection against sudden or intermittent bright light conditions as well as viewing conditions requiring intermittent use of special corrective or filter lenses. As a result of the invention hereinabove set forth, special lenses are constantly available to the wearer of eyeglasses without necessitating the expense of and awkwardness of separate pairs of safety glasses.

The clip-on auxiliary lift lenses above described may readily be used with any safety glasses, or nonsafety glasses with simple adjustments taking at most a few seconds. In addition to the simplicity of the adjustments it will be seen that adjustment or modification of relative frame and auxiliary frame positions can not cause binding of the hinge assembly or otherwise hinder free pivotal action. This is the case since the hinge is centrally mounted and is independent, in its operation, of the amount of bow or distortion of the main eyeglass frame or the final adjusted positions, whether high or low, near or far, of the auxiliary lenses.

It will, of course, be observed that although half-lenses have been illustrated as the auxiliary lenses in the drawings, full or oversize lenses may be employed in their stead, where desired. Further, a single magnifying lens may be secured on one or the other side of the hinge 22 thereby providing an auxiliary high magnification visual aid.

It will be understood that variations and modifications may be made to the structure above described and illustrated without departing from the scope of the novel concepts of the pesent invention. It is, accordingly, my intention that the scope of the invention be limited solely by that of the hereinafter appended claims.

I claim as my invention:
1. In combination with eyeglasses comprising a frame of the type having a nose-engaging bridge member supporting spaced lens frame portions having outermost end portions hingedly connected to temple bows:
   auxiliary lens mechanism comprising a pair of auxiliary lenses mounted in fixed position in a substantially rigid auxiliary frame having lens-carrying rim portions fixed to an auxiliary nose bridge portion;
   support means for said auxiliary frame comprising a relatively thin bendably deformable wire bow member having a body of a length to extend at its respective opposite extremities to said outermost end portions;
   hinge means pivotally connecting said auxiliary frame to said bow member centrally relative to said auxiliary nose bridge portion;
   said hinge means including interleaved hinge sections with a center section fixed to the center of said wire bow member and outer sections fixed to said auxiliary nose bridge portion, and headed hinge pin screw means passing through said hinge sections and threadably engaged with one of said outer hinge sections for drawing said interleaver hinge sections together in a frictionally adjustable hinge;
   and said extremities having respective integral bent clips frictionally gripping said outermost end portions of the eyeglass frame immediately adjacent to the temple bows thereof and with said body spaced outwardly away from said lens frame and clear of the lenses therein;
   each of said integral bent clips comprising a vertically downwardly extending bent portion of said bow member followed by a reversely upwardly bent portion, a transversely bent portion and a subsequently downwardly bent portion providing an inverted "U" configuration adapted for engagement with the front and rear surfaces of said frame;
   said bow member body being permanently bendably deformable to adjust the same to move said hinge means and said lens carrying portions of said auxiliary frame upwardly or downwardly relative to the line of vision of a wearer of the eyeglasses.

(References on following page)

References Cited

UNITED STATES PATENTS

| | | | |
|---|---|---|---|
| 1,249,908 | 12/1917 | Day | 351—47 |
| 1,899,905 | 2/1933 | Uhlemann | 351—57 X |
| 2,599,716 | 6/1952 | May | 351—58 X |
| 2,714,717 | 8/1955 | Allman | 351—47 X |
| 2,756,632 | 7/1956 | Parsell | 351—153 X |
| 2,759,395 | 8/1956 | Wofford | 351—57 X |
| 2,818,774 | 1/1958 | Olnhausen | 351—57 |

FOREIGN PATENTS

| | | |
|---|---|---|
| 638,428 | 6/1950 | Great Britain. |
| 791,062 | 9/1935 | France. |

DAVID H. RUBIN, *Primary Examiner.*